United States Patent [19]

Giatras et al.

[11] 4,362,069
[45] Dec. 7, 1982

[54] HIGH EFFICIENCY, ABRASION RESISTANT PRODUCT AND PROCESS

[75] Inventors: James L. Giatras, Spring City; Edward B. Golas, Conshohocken; Wayne F. Reed, Norristown, all of Pa.

[73] Assignee: Markel Corporation, Norristown, Pa.

[21] Appl. No.: 169,280

[22] Filed: Jul. 16, 1980

Related U.S. Application Data

[63] Continuation-in-part of Ser. No. 25,901, Apr. 2, 1979.

[51] Int. Cl.³ .................. B32B 15/00; F16C 1/10; F16L 11/06
[52] U.S. Cl. .................. 74/501 P; 428/36; 428/368; 428/372; 428/379; 428/389; 428/398; 264/122; 264/127
[58] Field of Search .......... 428/375, 376, 379, 398, 428/422, 372, 36, 389, 384, 368; 174/110 FC; 74/501 R, 501 P; 525/189, 132; 260/42.27, 42.49; 264/122, 127

[56] References Cited

U.S. PATENT DOCUMENTS

| | | | |
|---|---|---|---|
| T952,005 | 11/1976 | Attwood et al. | 525/189 |
| 2,752,637 | 7/1956 | Walker et al. | 264/127 X |
| 2,821,092 | 1/1958 | Cordora et al. | 74/501 P |
| 3,015,969 | 1/1962 | Bratz | 74/501 P |
| 3,954,932 | 5/1976 | Coale | 264/127 X |
| 4,026,863 | 5/1977 | Iseki et al. | 428/375 |
| 4,056,594 | 11/1977 | Carrow | 264/127 X |
| 4,075,158 | 2/1978 | Coale | 525/189 |
| 4,099,425 | 7/1978 | Moore | 74/501 P |
| 4,112,708 | 9/1978 | Fukuda | 74/501 P |
| 4,225,547 | 9/1980 | Okita | 264/127 |

FOREIGN PATENT DOCUMENTS

| | | | |
|---|---|---|---|
| 154475 | 8/1951 | Australia | 264/127 |
| 52-24251 | 2/1977 | Japan | 525/189 |

OTHER PUBLICATIONS

Arkles ETA, Wear *Behavior of Thermoplastic Polymer--Filled PTFE Composites*, Lubricating Engineering, vol. 33, pp. 33-38.

*Primary Examiner*—Lorraine T. Kendell
*Attorney, Agent, or Firm*—Paul & Paul

[57] ABSTRACT

A fluorocarbon composite is provided for use as liners and particularly for use as wire insulation and in extruded tubing for push-pull cable assemblies. The composite has excellent anti-friction and abrasion-resistant properties and can be utilized in environments requiring operation over a wide range of temperatures and load conditions, including high temperature applications. The composition comprises a mixture of a polymer of tetrafluoroethylene and a polymer of arylene sulfide, which mixture may also include a filler.

21 Claims, 2 Drawing Figures

HIGH EFFICIENCY, ABRASION RESISTANT PRODUCT AND PROCESS

This application is a continuation in part of Ser. No. 25,901, Apr. 2, 1979.

BACKGROUND OF THE INVENTION

1. Field of the Present Invention

This invention relates to a new high efficiency, abrasion-resistant fluorocarbon polymer composite which has substantially improved properties over a wide range of temperature and load conditions. More particularly, the invention is directed to abrasion-resistant, anti-friction tubing and particularly liners for use as wire insulation and in push-pull cable assemblies. It is fabricated from a mixture of polymers of tetrafluoroethylene (hereinafter called PTFE), a polymer of arylene sulfide, and optionally a filler.

Use of the liners of the present invention is contemplated in automobile, aviations, marine, electrical, and industrial engineering applications. In addition to reciprocating motion, this tubing can be used for rotary motion, such as speedometer assemblies, linear unidirectional motion, such as conveying mechanisms for feeding cable, solder and flexible welding wire, or for motion typical in the use of wire insulation. Additionally, the fluorocarbon composite may be utilized in applications where resistance to cold flow is essential.

2. Prior Art Statement

Fluorocarbon polymers are materials which are well known in the art. Polytetrafluoroethylene resins have heretofore been utilized in extruded tubular products, however, in its pure form it has proved to wear too rapidly and therefore has required use of fillers to enhance its wear resistant properties. See U.S. Pat. No. 3,409,584. Likewise, it is broadly known to incorporate a fluorocarbon polymer with an arylene sulfide polymer, however, efforts to produce an arylene-sulfide-polymer-filled PTFE extruded tubular product have heretofore been found to result in a poor quality product.

In U.S. Pat. No. 4,075,158, issued to Coale, a flexible extruded product was fabricated from a mixture of a polyphenylene sulfide and a filler selected from a group of fillers with at least one of the fillers being PTFE. The patent requires the polyphenylene sulfide to be present in an amount of at least approximately 30% by weight and that the polytetrafluoroethylene be present in the mixture in an amount of at least 20% by weight of the total mixture. Other fillers which can be added to the mixture of polyphenylene sulfide and PTFE include: glass fibers, asbestos fibers, molybdenum disulfide, carbon fillers, and the like.

Recently in *Lubrication Engineering*, Volume 33, pages 33 to 38, it was reported that polypheylene sulfide ("PPS")/PTFE sintered parts exhibit compressive modulus higher than any filled PTFE compound and that this high compressive modulus accounts for a thirty-fold reduction in wear rate of the polyphenylene sulfide/PTFE surface and mating surface when compared with glass filled PTFE. This report compares sintered parts having 20 and 40 weight percent polyphenylene sulfide present and indicates better compressive strengths and reductions in wear rate at 40 weight percent. These findings are consistant with the Coale Patent which requires that polyphenylene sulfide be present in an amount of at least 30% by weight.

In U.S. Pat. No. 4,026,863, issued to Iseki, et al., a fluorocarbon polymer composite is disclosed, which comprises a fluorocarbon polymer and a filler in the form of powder, granules, beads, fiber, or the like. The filler is further disclosed as being given a surface treatment utilizing polyphenylene sulfide. Iseki discloses applying polyphenylene sulfide to the surface of the filler (comprising 80 weight parts maximum based upon 100 weight parts PTFE). As disclosed, the maximum amount of polyphenylene sulfide permitted in a composition containing 100 parts PTFE and filler is about 10 weight percent, and preferably from 2 to 5 weight percent, based upon the filler. Also, implicit in Iseki, et al., is that when more usual amounts of filler are utilized, say 20 to 30 parts per 100 parts PTFE, the amount of polyphenylene sulfide present in the composition is less than 1% by weight. Moroever, it is further disclosed that when the amount of polyphenylene sulfide is greater than the above limits, the characteristics of the fluorocarbon polymer composite containing the filler are deteriorated by imparting properties of the polyphenylene sulfide.

We have found that many compositions suggested in the art are unacceptable when applied to products made by extrusion, and particularly, when the ultimate product is an extruded tubular product. Furthermore, it has been found that when the extruded product must be abrasion-resistant anti-friction type tubing for use in a range of temperatures and load conditions, many prior art compositions and properties of such compositions deteriorate, thus excluding them from effective use in such an environment.

One of the typical uses of extruded tubular products of the present invention is in automotive applications where, for example, the products are exposed to temperatures ranging from minus 40° F. to plus 400° F. and where they are required to convey a movement through crowded compartments which often mandates serpentine routing. Thus the motion is conveyed in an environment where the distribution of forces and contact area is constantly changing.

We have likewise found that previous teachings, developments, and data do not account for the above diverse conditions. Moroever, data related to rotary bearings or compressor piston rings is not helpful in predicting performance in the above abrasion-resistant, anti-friction tubing applications, and in fact, the traditional ASTM test (eg. tensile strength, elongation, hardness, specific gravity) cannot be utilized to predict or guarantee performance of tubing in the aforementioned environment.

It is therefore an object of the present invention to provide a fluorocarbon polymer composite which is compatible with fabricating extruded liners.

It is another object to provide high efficiency, abrasion-resistant, anti-friction, extruded tubing for use as liners in unidirectional, reciprocating, or rotary cable assemblies.

It is yet another object to provide abrasion-resistant dialectric insulating material which has excellent resistance to cold flow.

It is a further object to provide abrasion-resistant, anti-friction tubing which operates efficiently in a wide range of temperatures and load conditions in complex and serpentine type routing environments.

It is still a further object to provide fluorocarbon polymer composite liners which operate efficiently and effectively in complex routing environments at temperatures ranging from −40° F. to 400° F.

It is still yet a further object to provide a fluorocarbon polymer composite which has a tendency to arrest and/or offset the effects of stress relaxation, which generally occur over a period of time.

Other objects and advantages of the present invention will become apparent from the following description taken in connection with the accompanying drawings and examples wherein it is set forth by way of illustration certain embodiments of the present invention.

DETAILED DESCRIPTION OF THE INVENTION

Figure 1:
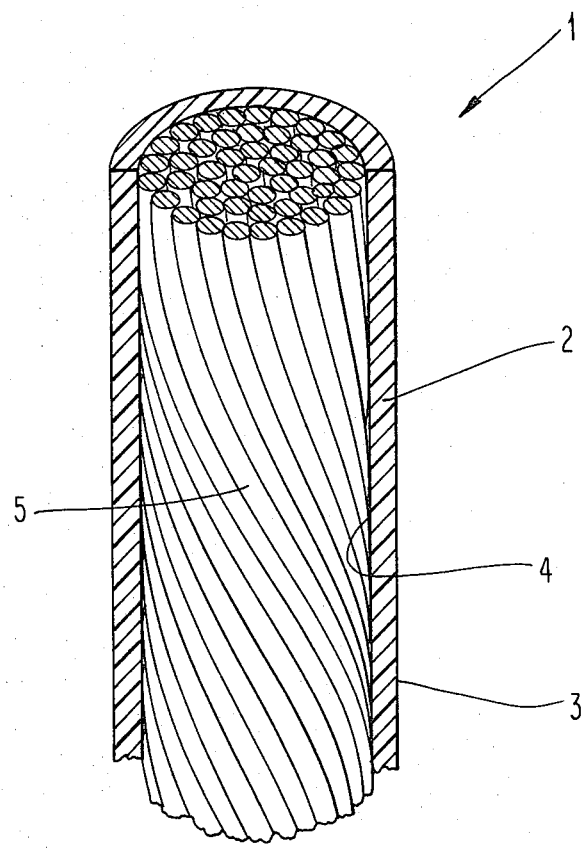
FIG. 1 is a fragmentary perspective sectional view of an extruded tubular product used in push-pull cable systems of the present invention.

Referring more in detail to the drawings: detailed embodiments of the present invention are disclosed herein, however, it is to be understood that the disclosed embodiments are merely exemplary of the invention which may be embodied in various forms. Therefore, specific compositional, structural and functional details disclosed herein are not to be interpreted as limiting, but merely as a basis for the claims and as a representative basis for teaching one skilled in the art to variously employ the present invention in virtually any appropriate manner. The reference FIG. 1 designates generally an extruded tubular product utilized in a push-pull cable system or a liner for use as insulation. The illustrated structure includes a liner 2 forming a material chamber 4 having a mating surface, in this instance, with stranded steel rope 5. It is understood that in the context of insulated wire for electrical applications, that the wire may or may not be stranded. Stranded steel rope 5 is contained inside extruded tubing 2. When liner 2 is utilized in push-pull cable systems, outside surface 3 of the extruded tubing 2 is, in most cases, covered by steel ribbon armor or wire serve (not shown) which is in turn placed in an aluminum (or other metal) supporting conduit or jacket (not shown). Such push-pull cable systems are well known in the art.

In the practice of the invention, a mixture of a polymer of tetrafluoroethylene is blended with a filler which includes a polymer of arylene sulfide, by mixing and tumbling same at temperatures of about 72° F. or less. As distinguished from the claimed subject matter infra, the reference here made to arylene sulfide polymer as a filler should be distinguished from the inert fillers or additives such as glass, graphite, metals, metal oxides, and the like. The fluorocarbon polymers used in the present invention are conventional fluorocarbon polymers obtained by conventional means, for example, by the polymerization of tetrafluoroethylene under pressure using free-radical catalysts such as peroxides or persulfates. It is preferable to use PTFE polymers which are suitable for paste extrusion molding and therefore the forms of the PTFE polymers are generally powders such as extrusion grade powders, fine powders, and the like. The preferable PTFE powders are fluffy, like flour and are not granular. The preferable arylene sulfide polymer is poly (phenylene sulfide) ("PPS"), which is generally para-phenylene units linked by sulfide groups, either linear or branch, and is avaliable in commerce under the trademark Ryton, sold by Phillips Petroleum Company. The PPS employed in the tubing of the present invention may be a general purpose grade with average particle size (i.e. about 100 microns) or may be a grade having an average particle size of about 50 microns (typically used in electrostatic spray applications). In either instance the PPS may be partially precured. Additionally, additives such as lubricating fluids, glass, metals and metal oxides, or the like, in the form of liquid, powder, granules, beads, fiber or the like, may be incorporated into the composite.

The fluorocarbon polymer composite of the present invention may be processed using various fabricating methods including various extruding techniques known in the art. It can also be used to fabricate tubes, rods, wire coating, liners and the like.

In fabricating such composites we prefer to utilize a volatile lubricant, such as naphtha, in the range of about from 10 to 25% by weight. In the extrusion process, for example, the fluorocarbon polymer composite is compressed into a cylindrical preform where the powders cold flow; there is no melting. After extrusion, the preform passes through an oven, where it passes through a two stage thermal process whereby the extrusion aid is volatilized at approximately 149° C. (300° F. ) followed by a sintering heat treatment at about 327° C. (620° F.), to fuse or sinter the compressed powders into a homogeneous product. This two step process is in the preferred embodiments carried out as a continuous process.

The resulting product is an abrasion-resistant, antifirction extruded liner which has a high efficiency and good resistance to cold flow. This product has a medium molecular weight so that at the wearing surfaces or interfaces there isn't an excessive amount of flow which would detract from the product's ability to resist abrasion. Unlike the inert fillers or additives, it is believed that the polymers of arylene sulfide create a matrix which enhances the abrasion-resistant, anti-friction properties of the product into which inert fillers may be added to increase strength without incurring the attendant decrease in abrasion resistance over the life cycle of the product. This product may be further treated by post curing same at about 260° to 485° C. (500° to 905° F.) from about 5 minutes to 24 hours, and preferably at from about 260° to 275° C. (500° to 527° F.) for at least about 16 hours, depending on state of cure of the PPS prior to blending. It should also be understood that the PPS can be precured and then ground prior to blending and fabrication.

The following examples, while not limiting, illustrate the above improvements achieved by the fluorocarbon composite of the present invention and support the various claims and their limitations. The synergistic results have been found broadly in fluorocarbon polymer composites and products fabricated therefrom comprising from about 5 to 25 phr (weight parts per hundred resin) of PPS which composite may optionally contain an additive referred to in the claims as a filler, wherein the combined mixture of fillers and PPS is less than about 30 phr; the filler is preferably up to 13 phr, and preferably in the range of from about 5 to 12 phr and 8 to 20 phr. One of the more preferable compositions contains from about 5 to 8 phr filler with from about 10 to 13 phr PPS. In the foregoing system the PPS is preferably from 6 to 12 phr. In extruding products from the above composite systems it is desirable to keep the amounts of filler and arylene sulfide in amounts about equal to or less than those defined by the line $y = -2x + 45$ and preferably about equal to or less than those defined by the line $y = -2x + 35$, where y is the filler or additive and x is the arylene sulfide. It has further been found that the composite system defined by the area within and including points ACDF and ABEF are preferable from an extrusion standpoint. It should be understood that these fabrication parameters are not intended to limit the scope of the synergistic compositions of the present invention.

Figure 2:
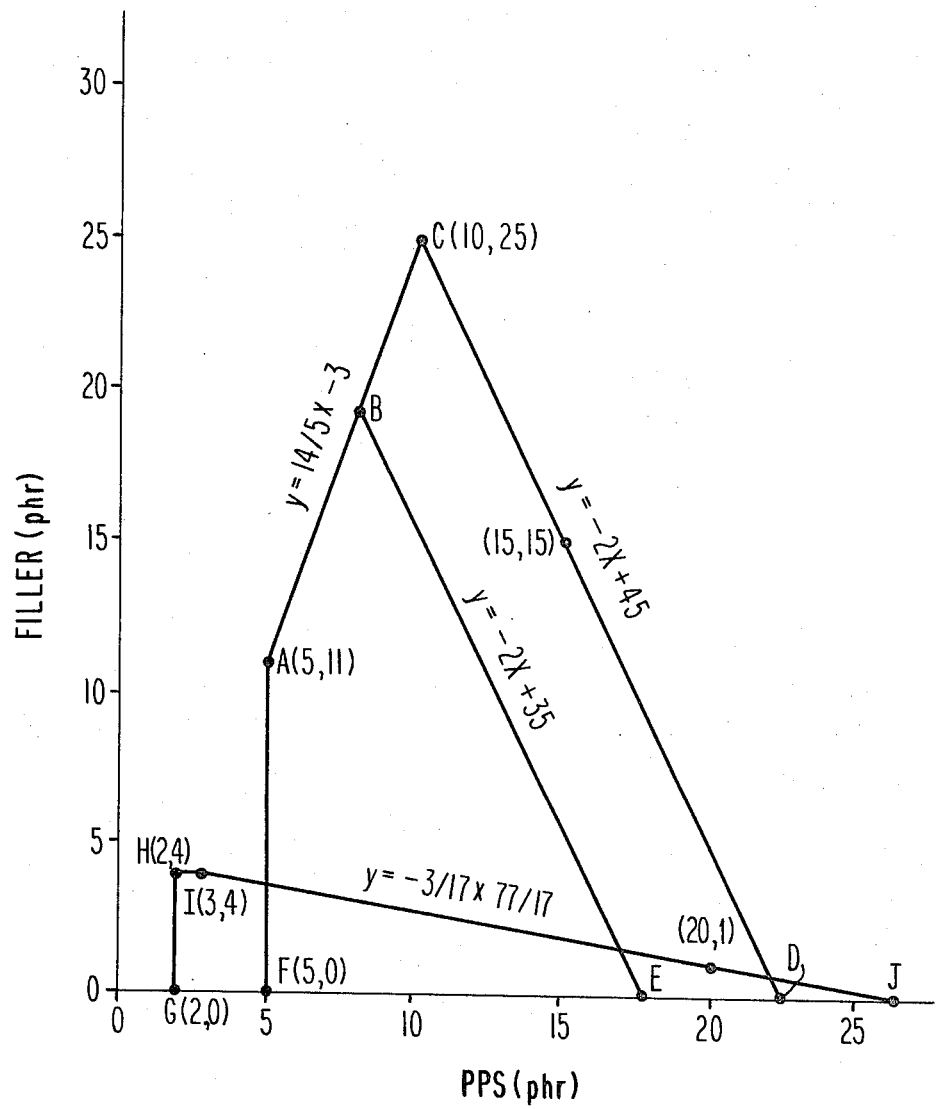
FIG. 2, is a graph depicting some of the compositions of the present invention.

It has been found that one of the above additives, namely lubricating fluids, which includes lubricating oils, light machine oil, silicone type oils (dimethy silicone fluids) and the like, and which have been utilized as wipes to lessen abrasion, have been found to significantly increase the abrasion resistance and frictional efficiencies of extruded products fabricated from selected fluorocarbon composites of the present invention when the lubricating fluids are applied to wearing surfaces or mating surfaces or interfaces of the product which are sujbect to abrasive forces. For example, in the context of push-pull cable systems, the cable moving within the extruded tube is wiped or coated with a lubricating fluid. In systems consisting essentially of fluorocarbon/arylene sulfide polymers it has been found that the addition of lubricating fluids to the wearing surfaces significantly increases the frictional efficiencies in systems with up to 25 phr arylene sulfide and preferably from 2 to 25 phr arylene sulfide. It has further been found that with small amounts of inert filler of about up to 4 phr, preferably 2 phr, and more preferably 1 phr, the frictional efficiencies significantly increase. However, as the amount of inert filler increases above these amounts, the addition of lubricating fluids has a deleterious effect on the product over its life cycle. In FIG. 2, the approximate area within and including the points GHIJ defines another embodiment in which amounts of inert filler and arylene sulfide are enchanced by utilizing lubricating fluids.

EXAMPLES

Formulas A through N as set forth in Table I, were blended and paste extruded into tubing utilizing the procedures set forth in the Detailed Description of the Invention, above. In each case, except where specified to the contrary: the PTFE is a tetrafluoroethylene fluorocarbon resin sold by Dupont as grade 6C; the PPS is a polyphenylene sulfide polymer ground to an average particle size of about 50 microns, has been partially precured prior to grinding and blending, and is sold by Phillips Petroleum Company under the trade name of Ryton, grade PR-01; and the filler is glass beads.

Formulas O through AB as set forth in Table II were prepared in the same manner as set forth above with respect to formulas A through N.

Formulas AC through AJ as set forth in Table III were prepared in the same manner as set forth above with respect to formulas A through N.

TABLE I

| FORMULA | PTFE | PPS | FILLER | POST CURE |
|---|---|---|---|---|
| A | 100 (virgin) | — | — | — |
| B | 95 | — | 5*1 | — |
| C | 100 | 2.04 | — | — |
| D | 100 | 6 | — | — |
| E | 100 | 6 | — | 16 hrs. @ 500° F. |
| F | 100 | 11 | — | — |
| G | 100 | 11 | — | 16 hrs. @ 500° F. |
| H | 100 | 25 | — | — |
| I | 100 | 5*2 | 6 | — |
| J | 100 | 5 | 6 | — |
| K | 100 | 5.32 | 1.06 | — |
| L | 100 | 5.88 | 11.76 | — |

TABLE I-continued

| FORMULA | PTFE | PPS | FILLER | POST CURE |
|---|---|---|---|---|
| M | 100 | 12.51 | 12.51 | — |
| N | 100 | 6.66 | 26.66 | — |

*1zirconium silicate
*2General purpose grade PPS with average particle size of 100 microns and no post cure.

TABLE II

| FORMULA | PTFE | PPS | FILLER |
|---|---|---|---|
| O | 100 | 2 | — |
| P | 100 | 2 | 1 |
| Q | 100 | 2 | 2 |
| R | 100 | 4 | — |
| S | 100 | 4 | 3 |
| T | 100 | 6 | — |
| U | 100 | 10 | 25 |
| V | 100 | 11 | — |
| W | 100 | 12 | 6 |
| X | 100 | 15 | 15 |
| Y | 100 | 18 | — |
| Z | 100 | 20 | 1 |
| AA | 100 | 20 | 10 |
| AB | 100 | 25 | — |

TABLE III

| FORMULA | PTFE | PPS | FILLER | TENSILE |
|---|---|---|---|---|
| AC | 100 | — | 6 | 6104 |
| AD | 100 | .64 | 6.38 | — |
| AE | 100 | 1 | 10 | 6907 |
| AF | 100 | 2 | 10 | 7362 |
| AG | 100 | — | 18 | 6495 |
| AH | 100 | .1 | 18 | 6387 |
| AI | 100 | 1.5 | 18 | 5951 |
| AJ | 100 | 2 | 43 | 3954 |

The formulations in Tables I, II and III were tested by securing the extruded tubing or liner having an ID of about 0.095" (0.2413 cm) and a wall of about 0.011" (0.02794 cm) over an "S" shaped routed fixture wherein the curvilinear portions of the inner radii of the "S" fixture extend about 120° and wherein a flexible cable is drawn through the liner, reciprocating at 60 cycles per minute, each cycle consisting of a forward travel of 1½ inches (3.81 cm) and a return of the same order. The temperature and load conditions under which the various formulations were tested, together with the frictional efficiencies of each during testing are set forth in Tables IV, V and VI. The load is applied by springs which may be adjusted to a range of six pounds, and therefore the tests were run 0–6 pounds (actually ¼ pound to 6½ pounds (about 0.258 to 2.95 Kgs) to keep some tension on the cable or compression on the liner throughout the cycle) and 3–9 pounds (about 1.36 to 3.19 Kgs). Measurements of frictional efficiency are taken at various intervals of cycles by employing a load cell (transducer) and recording the actual load necessary to move the cable over the surface of the liner at 4 cycles per minute (in this measurement the spring is replaced by a 5 pound (about 2.27 kg) dead weight). The frictional efficiency is calculated as a percentage by dividing the measured force into the five pound dead weight. The letter "F" following a given calculated efficiency at a given number of cycles indicates a failure or wearing through all of the liner by the cable, and is determined by the cable contacting a metal base after wear through, thereby, closing an electrical circuit which stops the tester. The weight loss is indicated in milligrams and obtained after the tubing is removed from the fixture, cleaned with a solvent, weighed and compared with the original weight (prior to testing) and the difference is recorded as weight loss due to abrasion.

TABLE IV

LIFE CYCLE TEST DATA

| FORMULA | TEST TEMP. F.° | LOAD | INITIAL EFFICIENCY | Cycles (Thousands) | | | | | | | | | | WEIGHT LOSS |
|---|---|---|---|---|---|---|---|---|---|---|---|---|---|---|
| | | | | 25 | 50 | 100 | 150 | 200 | 250 | 300 | 350 | 400 | 450 | |
| A | Rm. Temp. | 0–6 | 72 | 65F | | | | | | | | | | 175 |
| | 250 | 0–6 | 77 | 73 | 70F | | | | | | | | | 104 |
| | 400 | 0–6 | 84 | 79 | 74F | | | | | | | | | 30 |
| B | Rm. Temp. | 0–6 | 70 | 50 | 46 | 40 | 33 | 32 | 31 | 32 | 33 | 33 | 32 | 30 |
| | 250 | 0–6 | 77 | 76 | 74 | 73 | 72 | 72 | 73 | 72 | 72 | 70 | 66 | 30 |
| | 250 | 3–9 | 77 | 75 | 66 | 64 | 63 | 62 | 61 | 60 | 58 | 56 | 54 | 72 |
| C | Rm. Temp. | 0–6 | 74 | 62 | 61 | 58F | | | | | | | | 15.4 |
| | 250 | 3–9 | 82 | 75 | 77 | 79 | 80 | 80 | 79 | 78 | 78 | 77 | 77 | |
| D | 250 | 0–6 | 81 | 78 | 77 | 79 | 78 | 79 | 78 | 79 | 80 | 80 | 81 | 4.0 |
| E | Rm. Temp. | 0–6 | 81 | 70 | 70 | 72 | 72 | 73 | 73 | 71 | 71 | 72 | 68 | 10.0 |
| | 250 | 0–6 | 82 | 78 | 79 | 78 | 80 | 80 | 79 | 80 | 80 | 80 | 81 | 5.0 |
| F | 250 | 0–6 | 81 | 77 | 79 | 80 | 80 | 80 | 80 | 80 | 80 | 80 | 80 | 3.0 |
| G | Rm. Temp. | 0–6 | 82 | 68 | 72 | 77 | 75 | 73 | 70 | 69 | 69 | 70 | 70 | 7.0 |
| | 250 | 0–6 | 81 | 77 | 79 | 80 | 80 | 81 | 81 | 82 | 82 | 82 | 83 | 0 |
| H | Rm. Temp. | 0–6 | 73 | 68 | 68 | 68 | 69 | 69 | 69 | 68 | 68 | 67 | 67 | 7.6 |
| | 250 | 0–6 | 84 | 81 | 82 | 82 | 80 | 81 | 82 | 80 | 79 | 79 | 79 | 5.1 |
| I | Rm. Temp. | 0–6 | 72 | 63 | 63 | 63 | 63 | 63 | 63 | 64 | 64 | 64 | 64 | 23.0 |
| | 250 | 0–6 | 82 | 82 | 82 | 79 | 78 | 76 | 74 | 74 | 74 | 74 | 75 | 4.0 |
| | 400 | 0–6 | 82 | 77 | 74 | 76 | 78 | 78 | 78 | 79 | 79 | 79 | 79 | 8.0 |
| | 250 | 3–9 | 78 | 74 | 76 | 74 | 71 | 69 | 68 | 68 | 68 | 69 | 70 | 43.0 |
| J | Rm. Temp. | 0–6 | 74 | 66 | 70 | 74 | 74 | 75 | 76 | 76 | 76 | 77 | 76 | 7.0 |
| K | Rm. Temp. | 0–6 | 70 | 66 | 64 | 63 | 66 | 69 | 70 | 71 | 71 | 70 | 68 | 12.4 |
| | 250 | 3–9 | 87 | 78 | 79 | 81 | 82 | 82 | 82 | 81 | 80 | 81 | 79 | 11.4 |
| L | Rm. Temp. | 0–6 | 71 | 69 | 71 | 75 | 75 | 75 | 74 | 72 | 71 | 71 | 67 | 4.7 |
| | 250 | 3–9 | 83 | 73 | 73 | 73 | 73 | 71 | 69 | 69 | 68 | 65 | 63 | 12.2 |
| M | Rm. Temp. | 0–6 | 72 | 74 | 75 | 78 | 78 | 78 | 78 | 78 | 76 | 74 | 71 | 3.5 |
| | 250 | 3–9 | 83 | 80 | 79 | 76 | 72 | 71 | 71 | 73 | 74 | 72 | 69 | 7.6 |
| N | Rm. Temp. | 0–6 | 73 | 67 | 70 | 73 | 73 | 74 | 73 | 67 | 69 | 71 | 68 | 4.5 |
| | 250 | 3–9 | 78 | 66 | 65 | 63 | 61 | 60 | 58 | 53 | 48 | 42 | 35 | 40.9 |

TABLE V

LIFE CYCLE TEST DATA

| FORMULA | OILED O NOT OILED — | Cycles (Thousands) | | | | | WEIGHT LOSS |
|---|---|---|---|---|---|---|---|
| | | 100 | 200 | 300 | 400 | 500 | |
| O | O | 87 | 87 | 87 | 86 | 87 | 0.2 |
| P | — | 66 | 69 | 63 | 64 | 64 | 16.0 |
| | O | 84 | 81 | 80 | 79 | 78 | 14.0 |
| Q | — | 72 | 71 | 70 | 65 | 58 | 12.0 |
| | O | 87 | 87 | 87 | 87 | 87 | 1.0 |
| R | — | 61 | 58F | — | — | — | 122.0 |
| | O | 88 | 88 | 87 | 87 | 88 | 1.2 |
| S | — | 75 | 75 | 67 | 63 | 60 | 6.0 |
| | O | 88 | 87 | 87 | 87 | 84 | 1.0 |
| T | O | 87 | 88 | 88 | 87 | 87 | 5.0 |
| U | O | 73 | 74 | 74 | 75 | 76 | 5.0 |
| V | — | 66 | 66 | 65 | 65 | 65 | 26.0 |
| W | — | 75 | 75 | — | 71 | 67 | 3.9 |
| | — | 77 | 75 | — | 70 | 67 | 5.4 |
| X | — | 78 | 78 | 76 | 75 | 77 | 3.0 |
| Y | — | 66 | 66 | — | 65 | 63 | 8.5 |
| | — | 68 | 69 | — | 67 | 67 | 7.6 |
| Z | O | 88 | 85 | 86 | 85 | 85 | 5.0 |
| AA | — | 78 | 75 | — | 73 | 64 | 5.0 |
| | — | 75 | 73 | — | 72 | 67 | 3.2 |
| | — | 75 | 71 | — | 63 | 65 | 3.9 |
| AB | — | 68 | 69 | 68 | 67 | 66 | 8.0 |

*These tests were made at room temperature where the load was set at 0–6 pounds. This column indicates tests of the same formula under different conditions, i.e., oiled or not oiled, or on different dates. In the column marked 300, the "—" indicates that the frictional efficiencies at 300,000 were not measured.

TABLE VI

LIFE CYCLE TEST DATA

| FORMULA | TEST PARAMETERS* | Cycles (Thousands) | | | | | WEIGHT LOSS |
|---|---|---|---|---|---|---|---|
| | | 15 | 100 | 200 | 400 | 500 | |
| AC | — | 61 | 61 | 62 | 57 | 60 | 15.0 |
| | — | 61 | 60 | 60 | 58 | 61 | 16.0 |
| | — | 61 | 61 | 62 | 60 | 59 | 16.5 |
| AD | Rm Temp: 0–6 | — | 63 | 65 | 65 | 66 | 14.7 |
| | 250° F.: 3–9 | — | 68 | 65 | 66 | 63 | 21.8 |
| AE | — | 61 | 64 | 65 | 56 | 59 | 10.0 |
| | — | 61 | 64 | 66 | 60 | 56 | 11.7 |
| AF | — | 62 | 64 | 58 | 51 | 49 | 9.7 |
| | — | 62 | 63 | 61 | 53 | 50 | 8.7 |
| AG | — | 60 | 62 | 62 | 50 | 45 | 16.0 |
| | — | 60 | 63 | 61 | 56 | 50 | 16.5 |
| AH | — | 60 | 62 | 64 | 55 | 45 | 11.4 |
| | — | 61 | 64 | 63 | 60 | 52 | 10.0 |
| | — | 60 | 62 | 60 | 55 | 50 | 9.8 |
| AI | — | 61 | 64 | 57 | 50 | 48 | 9.4 |
| | — | 62 | 66 | 64 | 54 | 52 | 9.6 |
| | — | 62 | 65 | 63 | 55 | 50 | 8.6 |
| AJ | — | 61 | 60 | 54 | 50 | 47 | 7.7 |
| | — | 62 | 61 | 57 | 49 | 50 | 7.4 |
| | — | 62 | 64 | 63 | 57 | 50 | 9.5 |

*These tests were made at room temperature and at 0–6 load unless otherwise specified. The frictional efficiencies of formula AD were not measured at 15,000 cycles.

The frictional efficiencies, as measured above, have been found to very accurately predict the properties of the tubular product and appear more important than weight loss in predicting product behavior, although extremely low weight losses and those greater than about 40 mgs are believed to aid in predicting the wear properties over the life of the product.

As can be seen by comparing the tensile strengths for the given formulations of Table III with their frictional efficiencies in Table VI, one cannot predict the usefulness of extruded product based upon ASTM tensile strength.

The foregoing is intended only to summarize the compositional limitations of the present invention which are more fully set forth by the following claims.

What is claimed is:

1. An extruded tubular product consisting essentially of a mixture of a resin of fluorocarbon polymers and a polymer of arylene sulfide in the range of from about 5 to 25 weight parts per hundred resin.

2. An extruded tubular product as in claim 1, wherein said polymer of arylene sulfide is in the range of from about 15 to 20 weight parts per hundred resin.

3. An extruded tubular product consisting essentially of a mixture of a resin of polytetrafluoroethylene and a polymer of about 18 parts per hundred resin of polyphenylene sulfide.

4. An extruded tubular product consisting essentially of a mixture of a resin of fluorocarbon polymers, a polymer of arylene sulfide of from about 5 to 25 weight parts per hundred resin and a filler wherein said combined mixture of said filler and arylene sulfide is less than about 30 parts per hundred resin.

5. An extruded tubular product as in claim 4, wherein said filler is in an amount of up to about 13 weight parts per hundred resin.

6. An extruded tubular product as in claim 4, wherein said filler is in the range of from about 5 to 12 weight parts per hundred resin.

7. An extruded tubular product as in claim 4, wherein said polymer of arylene sulfide is in the range of from about 8 to 20 weight parts per hundred resin.

8. An extruded tubular product consisting essentially of a mixture of a resin of fluorocarbon polymers, a polymer of arylene sulfide and a filler wherein said filler and arylene sulfide are in amounts within and including the area defined by points ACDF as depicted in FIG. 2.

9. An extruded tubular product as in claim 8, wherein said amounts of arylene sulfide and filler are within and including the area defined by points ABEF, as depicted in FIG. 2.

10. An extruded tubular product as in claims 1, 9 or 8 wherein said fluorocarbon polymer is a tetrafluoroethylene fluorocarbon resin.

11. An extruded tubular product as in claims 1, 9 or 8 wherein said arylene sulfide polymer is poly(-phenylene sulfide).

12. An extruded tubular product consisting essentially of a mixture of a resin of fluorocarbon polymers, a polymer of arylene sulfide in the range of from about 10 to 13 weight parts per hundred resin, and a filler in the range of from about 5 to 8 weight parts per hundred resin.

13. An extruded tubular product consisting essentially of a mixture of a resin of fluorocarbon polymers, a polymer of arylene sulfide, and a filler, wherein said extruded tubular product further comprises an additive in the form of a lubricating fluid which is applied to the wearing surfaces of said extruded tubular product, said arylene sulfide and filler being in amounts within and including the area as defined by the points GHIJ as depicted in FIG. 2.

14. An extruded tubular product as in claim 13, wherein said filler is up to an amount of about 2 parts per hundred resin.

15. An extruded tubular produce as in claim 13, wherein said filler is up to an amount of about 1 weight part per hundred resin.

16. An extruded tubular product as in claims 4, 8, or 13, wherein said filler is selected from the group consisting of glass, metal, and metal in oxides, in the form selected from the group consisting of granules, beads, and fiber.

17. An extruded tubular product as in claims 4, 8, or 13 wherein said filler is glass beads.

18. In a push-pull cable system comprising an extruded tube and a cable within said extruded tube, said cable moveable within said extruded tube, wherein said extruded tube is the extruded tubular product as in claims 1, 3, 4, 8, or 13.

19. A process for fabricating an extruded tubular product having the composition as in claims 4 or 6 comprising the steps of forming a mixture consisting essentially of powders of a fluorocarbon polymer resin, a polymer of arylene sulfide in the range of from 5 to 25 weight parts per hundred resin and a volatile lubricant, compressing said mixture into a tubular preform whereby said powders cold flow but do not melt, heating said preform to volatilize said lubricant, thereafter sintering said preform into a homogenous product, and post curing said sintered product at a temperature from about 260° to 485° C. for a period of time in the range of from about 5 minutes to 24 hours.

20. The process as in claim 19, wherein said temperature is from about 260° to 275° C.

21. The process as in claim 20, wherein said time is about 16 hours.

* * * * *